UNITED STATES PATENT OFFICE.

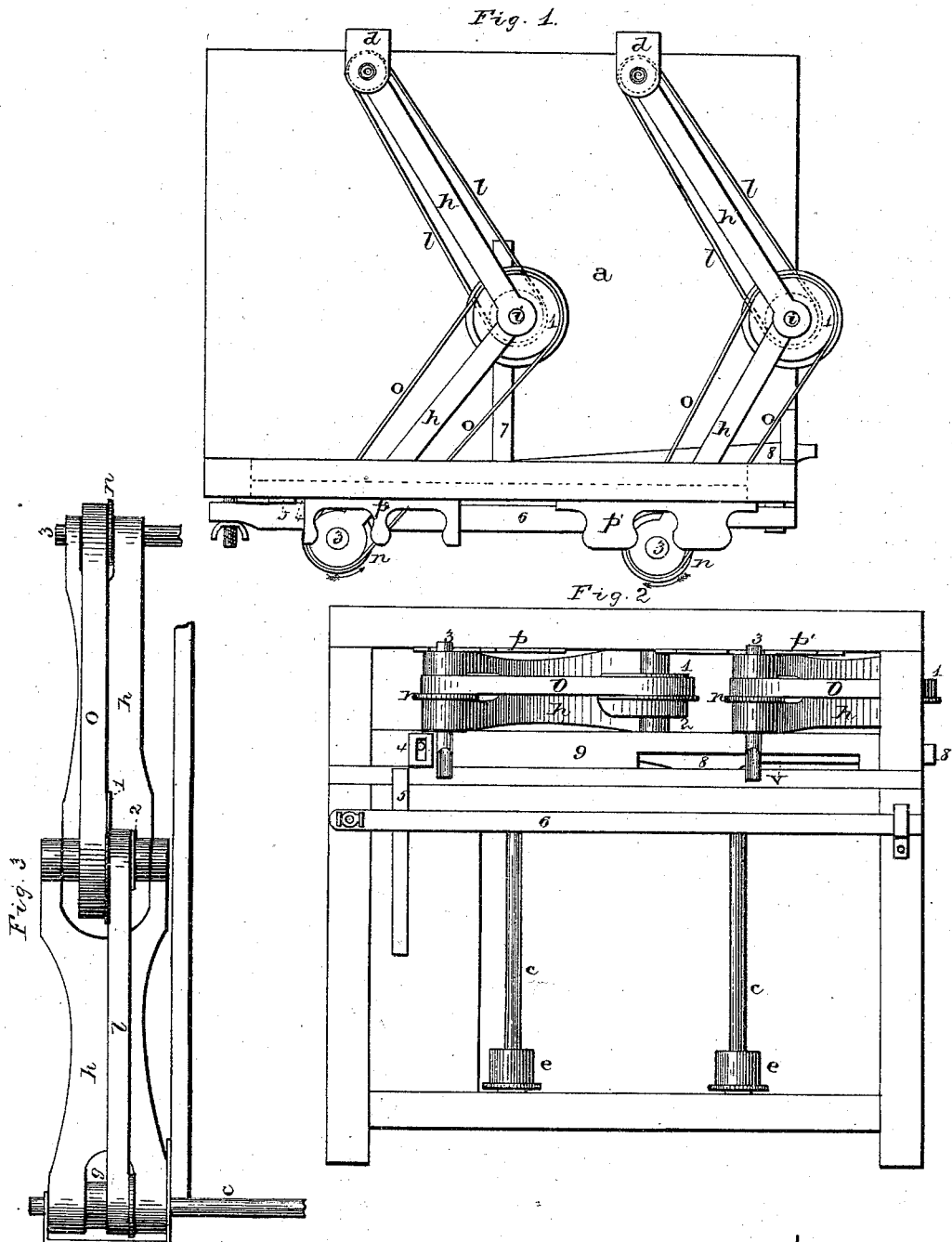

ALEXANDER THOMSON, OF AMES, IOWA.

IMPROVEMENT IN DOVETAILING-MACHINES.

Specification forming part of Letters Patent No. 147,708, dated February 17, 1874; application filed August 18, 1873.

*To all whom it may concern:*

Be it known that I, ALEXANDER THOMSON, of Ames, county of Story and State of Iowa, have invented certain new and useful Improvements in Dovetailing-Machines, of which the following is a specification:

The nature of my invention relates to an improvement in machines for cutting curved forms; and it consists in the arrangement and combination of parts, which will be more fully described hereafter, whereby a revolving bit is attached to a jointed arm, so that the bit can be made to follow curved forms, and cut the dovetails for boxes and drawers.

The accompanying drawings, represent my invention.

$a$ represents a frame of any suitable form or size. Secured to the rear side of this frame are the vertical shafts $c$, provided with driving-pulleys $e$. These shafts extend up through loose bearings in the brackets $d$, secured to the top of the frame, and serve as a pivot upon which the jointed arms turn, and which have the driving-pulleys $g$ keyed to them between the bifurcated ends of the arms. These arms consist of two sections, $h$, pivoted together by the shaft $i$, provided with loosely-revolving large and small pulleys, 1 2. These pulleys receive motion from the pulleys $g$ through the belt $l$, and in turn transmit it to the pulley $n$, in the outer end of the arm, to which the cutting-bit is fastened, through the belt $o$. The outer end of the arms have studs or projections 3, formed upon them, which, catching in the edges of the patterns $p$ $p'$, serve as guides to the cutting-bits, and cause them to cut a fac-simile of the pattern in the wood beneath. The arms are pivoted together by the stationary shaft $i$, which does not revolve, so as to prevent wear upon the arms at the joint, and which allows a perfect freedom in moving the bits about in any direction, so that patterns of almost any kind can be cut with great rapidity, the bits having either a straight or curved cutting-edge, and are of the same diameters as the studs 3. To the front of the machine are attached a movable stop, 4, a guide, 5, and a lever, 6, for holding the work to be operated upon. Upon the top of the frame are secured a second guide, 7, and a lever, 8.

To work the pins upon a drawer front, the bit is brought up to the stop 4, and the lower end of the stop raised above the lower end of the bit a distance equal to the depth of the pins, and then move the guide pin or stud 3 around the pattern $p$. This will shape the pins. Then work the bit backward and forward in the spaces between the pins, until the remaining portion is cut out. This completes this part of the work. In order to shape the sides to fit these pins, place the side under the steadying-bar 9, which prevents the arms from being depressed by the operator, at the point $v$, and clamp it with the lever 8 to the top of the frame, letting it project far enough beyond the outer end of the pattern $p'$ to allow the bit to trim its outer end. Take one of the arms and move the stud around such parts of the pattern as to cause it to cut all those parts of the side which have the grain of the wood right for that bit, and then place it to one side and use the other bit, which revolves in an opposite direction in the same manner over the remaining parts. When finished, these sides will be found to exactly fit the pins.

By making suitable patterns, this machine can be used for a tenoning-machine, with the advantage of cutting out the space between the tenons.

In doing ordinary work, one of the jointed arms is sufficient; but when nice work is to be done, the second one is required. The two bits are caused to revolve in opposite directions, so as to cause them to cut in the direction of the grain of the wood, thus avoiding roughing up the surface, or splitting off pieces.

I make no claim to the arrangement of the cutting-tool and guide upon opposite ends of the same arbor, in connection with pattern and work-supporting tables.

I do not claim to be the first to use jointed arms provided with pulleys operated by bolts— witness the patent to A. S. Gear and others; but

What I do claim as new, and desire to secure by Letters Patent of the United States, is—

1. The combination of the bits, guiding-studs, and patterns, substantially as shown.

2. In a machine for cutting irregular forms, the pattern $p$, placed above the revolving bits and adjustable arms, substantially as set forth, arranged and operating for the purpose of enabling the operator to follow his guide without obstruction.

In testimony that I claim the foregoing as my invention, I hereunto affix my signature this 12th day of August, 1873.

ALEXANDER THOMSON.

Witnesses:
  JAMES MATHEWS,
  W. C. EDDY.